Dec. 10, 1957 H. W. GLASER ET AL 2,816,161

TELEGRAPH TRANSMITTER

Filed June 16, 1954 4 Sheets-Sheet 1

*INVENTORS*
H. W. GLASER
T. E. MELICK

*BY* M. R. Marsh

ATTORNEY

Dec. 10, 1957 H. W. GLASER ET AL 2,816,161

TELEGRAPH TRANSMITTER

Filed June 16, 1954 4 Sheets-Sheet 2

INVENTORS
H. W. GLASER
T. E. MELICK

BY

M. R. Marsh

ATTORNEY

Dec. 10, 1957 H. W. GLASER ET AL 2,816,161

TELEGRAPH TRANSMITTER

Filed June 16, 1954 4 Sheets-Sheet 3

INVENTORS
H. W. GLASER
T. E. MELICK
BY
F. R. Marsh
ATTORNEY

Dec. 10, 1957 H. W. GLASER ET AL 2,816,161

TELEGRAPH TRANSMITTER

Filed June 16, 1954 4 Sheets-Sheet 4

*INVENTORS*
H. W. GLASER
T. E. MELICK

*BY* M. R. Marsh

ATTORNEY

United States Patent Office 2,816,161

Patented Dec. 10, 1957

2,816,161

TELEGRAPH TRANSMITTER

Harry W. Glaser, Middle Village, N. Y., and Thomas E. Melick, Neshanic, N. J., assignors to The Western Union Telegraph Company, New York, N. Y., a corporation of New York Application June 16, 1954, Serial No. 437,164

11 Claims. (Cl. 178—17)

This invention relates primarily to automatic telegraph transmitters of the type employed to sense a storage medium, such as for example a perforated tape, and transmit to a sending circuit the signals stored therein, and more particularly to an arrangement whereby a transmitter may be operated or controlled to sense and transmit the signals stored in selected portions of the storage medium a plurality of times.

In many present day telegraph switching systems, message signals received at a central office or switching center normally control reperforators to store the received message signals in perforated tapes. The tapes are subsequently employed to control tape transmitters to repeat the messages into sending circuits or lines extending toward the destinations of the messages. In some switching systems, directing or destination indicating characters are transmitted in conjunction with each message and precede the same and selectively control switching apparatus at the switching center to automatically direct the messages to the desired outgoing circuits. Normally the directing characters employed to control the switching apparatus can not be retransmitted as they are used or consumed in performing the control functions. Thus, unless the directing characters are duplicated or stored more than once ahead of the messages, or two transmitters are employed which is an expense and adds complications to the control circuits, a message can not be automatically switched through more than one switching center.

In view of the above it is one of the primary objects of the present invention to provide an arrangement or device for use in conjunction with a telegraph signal transmitter, such as a tape transmitter and adapted for remote and/or automatic control, to enable selected sections of the associated controlling storage tape to be sensed a plurality of times by the same tape transmitter.

Another object of the present invention is to provide an attachment for telegraph tape transmitters to enable selected portions or sections of the controlling storage tape to be operatively associated with the sensing pins a plurality of times and wherein the length of the selected portions or sections of the tape is not fixed and can be readily varied.

Still another object of the invention is to provide a device of the above type wherein the tape is adapted to control the transmitter a plurality of times without backstepping of the tape by the means normally employed to advance the same.

Still another object of the present invention is to provide a device of the above type wherein the tape is conditioned for a repeat transmission of a selected portion thereof in a relatively short interval of time.

Still another object of the present invention is to provide a device of the above type which is simple and efficient in operation and which may readily be associated with the present day type of telegraph tape transmitters.

The above and further objects of the present invention will be more apparent from the following detailed description of the preferred embodiment thereof, wherein reference is made to the accompanying drawings, in the latter of which:

Figure 1:
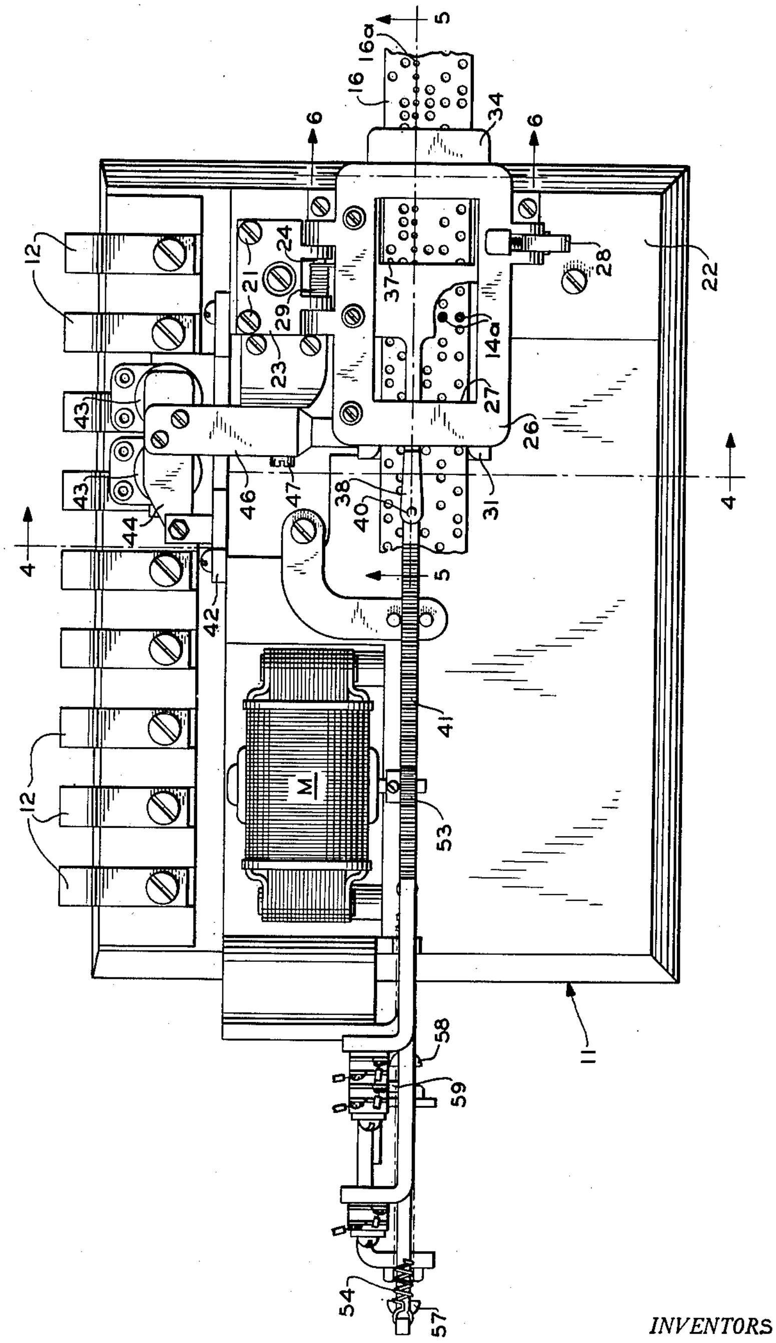
Fig. 1 is a plan view of a tape transmitter of a well known type with the device of the present invention associated with and attached thereto together with a short section of a perforated tape employed to control the operation of the transmitter.
Figure 4:
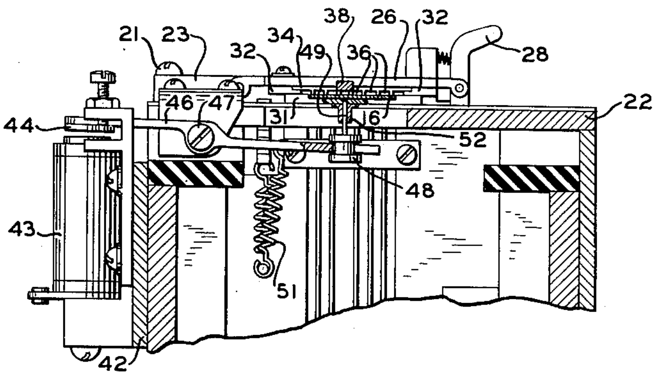
Figures 5, 7, 8:
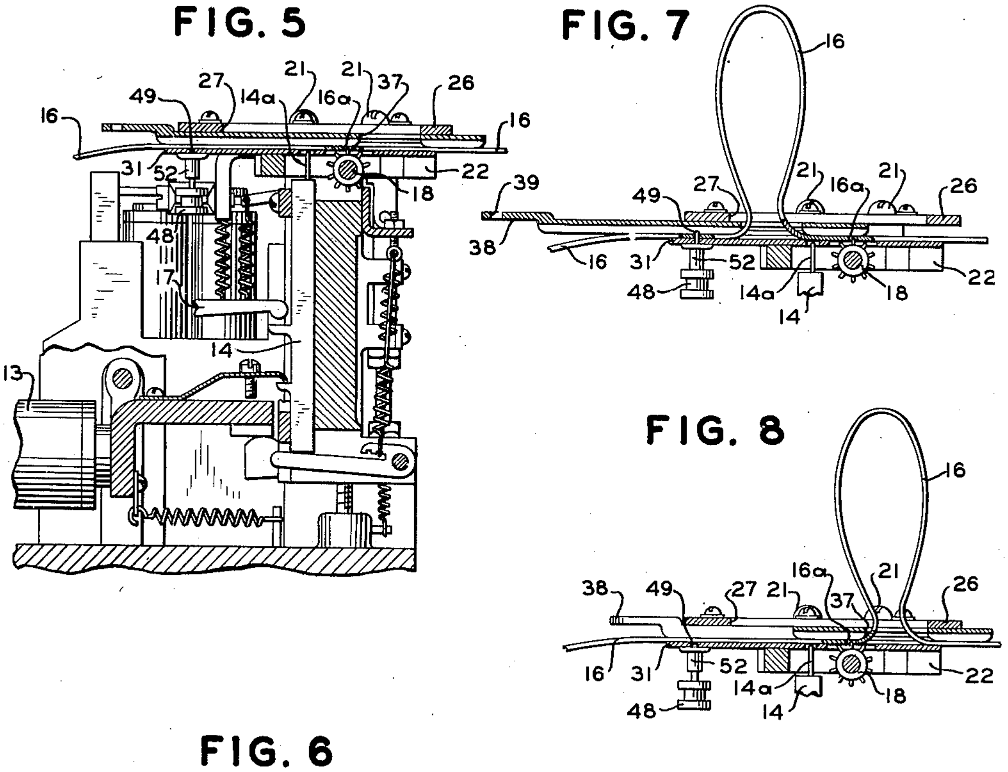
Figure 6:
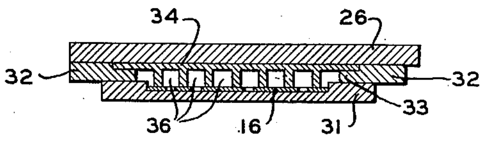
Figure 9:
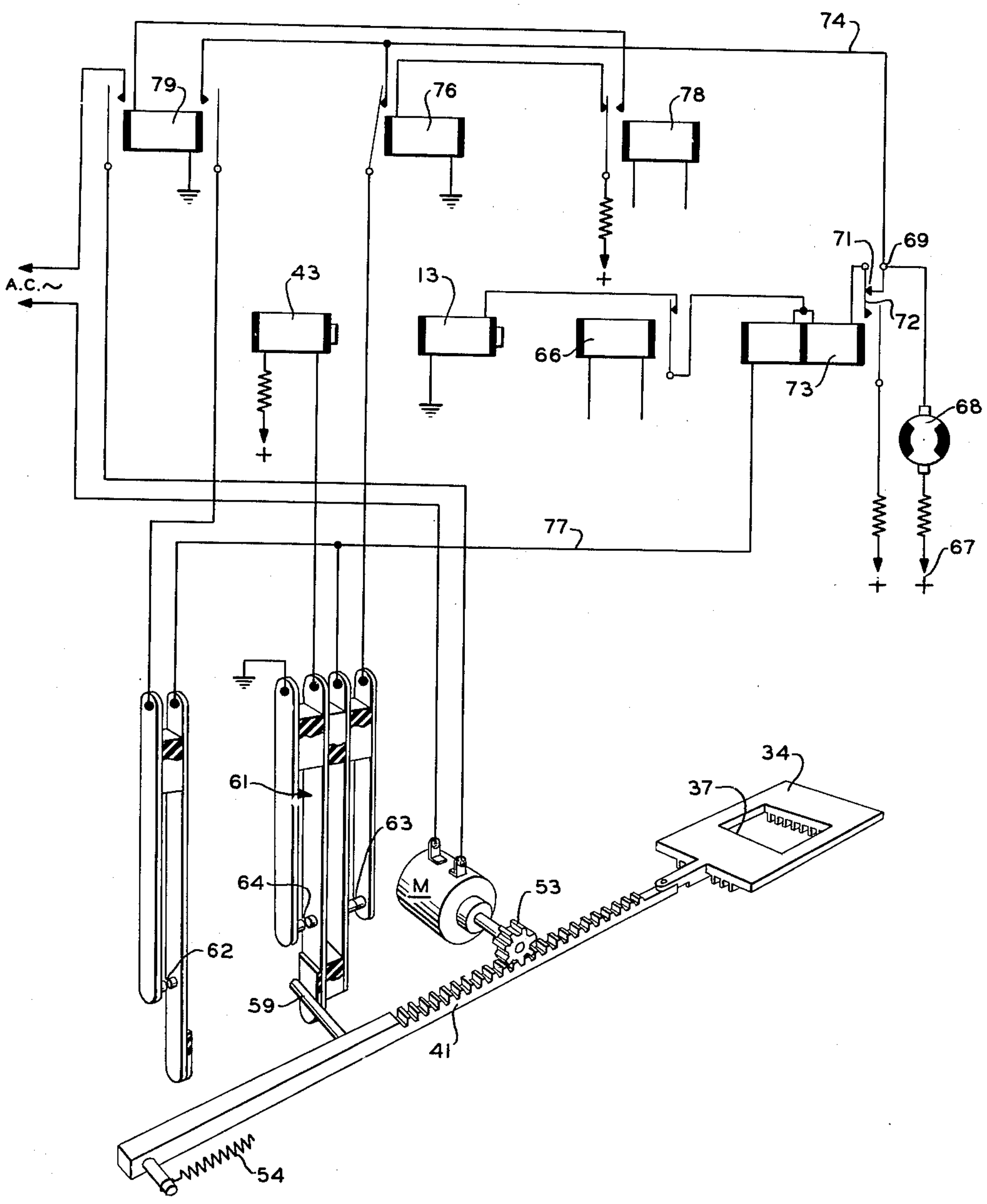

Figs. 4, 5 and 6 are detailed sectional views taken substantially on lines 4—4, 5—5 and 6—6, respectively, of Fig. 1;

Fig. 7 is a sectional detailed view of some of the operating elements in one operated position;

Fig. 8 is a sectional detailed view of the elements of Fig. 7 in another operated position; and Fig. 9 is a circuit diagram of the electrical elements associated and employed to control the transmitter and related mechanisms.

In general, the present invention comprises a mechanism or organization of elements together with control circuits cooperating therewith for attaching to and operating in conjunction with a storage tape control sensing mechanism. For the purposes of illustrating the principles and features of the invention it is described as it may be employed in conjunction with an automatic telegraph tape signal transmitter wherein a perforated storage tape is employed to control the transmitter to cause the transmission of permutation code groups of signals representing the perforations in the tape. However, it will be apparent that the principles of the invention are not limited to use in conjunction with a perforated tape transmitter but may equally well be applied to various other devices employing a control tape or other type of storage medium.

In the conventional type of telegraph tape transmitter a perforated control tape is intermittently advanced in conjunction with the transmission of a code group of characters representing signal impulses and when it is desirous or necessary to rerun or retransmit the signals in a given section of the tape, it is necessary to manually reset the tape. This requires the stopping of the transmitter, releasing the tape lid, resetting the tape to the desired point, reclosing the lid, and restarting of the transmitter. Obviously, this requires considerable time and care must be exercised lest the fragile tape be torn or mutilated. The present invention provides means for remotely controlling or automatically enabling the control tape to be reset so that a selected portion thereof may be run a second time over the pins of the transmitter and thus enable selected signals in the tape to be repeated. As pointed out hereinbefore, this arrangement is sometimes necessary where it is desired to retransmit the signals in a tape which have been employed to control automatic switching equipment at one location such as a switching center so that the same signals may be retransmitted and reemployed at another switching center, for example, to control switching equipment thereat.

In the described embodiment of the invention means are provided, when it is desired to repeat transmission of a given section of the tape, for blocking movement of the tape at some point after the sensing pins with respect to the direction of normal movement of the tape through the transmitter and cause a tape loop to be formed in the tape between the sensing pins and the point at which it is blocked. The tape loop will contain for the most part the signals which are to be retransmitted a second time and when the desired signals are accumulated in the tape loop, the major portion of the loop or all but a few signals therein is moved to a position before the sensing pins in respect to the normal direction of movement of the tape through the transmitter. The tape block is then removed and the loop of tape containing the signals which have already passed over the sensing pins once, pass over the sensing pins a second time. Thus the signals in the tape which are transmitted between the time the movement of the tape is blocked and subsequently unblocked may be transmitted twice. Since the backward movement of the loop of tape can be accomplished in a relatively short interval of time, the switching equipment and associated mechanism are not unduly tied up and since the size of the loop formed in the tape for retransmission is not limited, any number of signals in the tape can be retransmitted, even as many signals as those representing one or more complete messages. The following detailed description of the operation of the device embodying the present invention will more fully set forth the features and operating characteristics thereof.

Figures 2, 3:
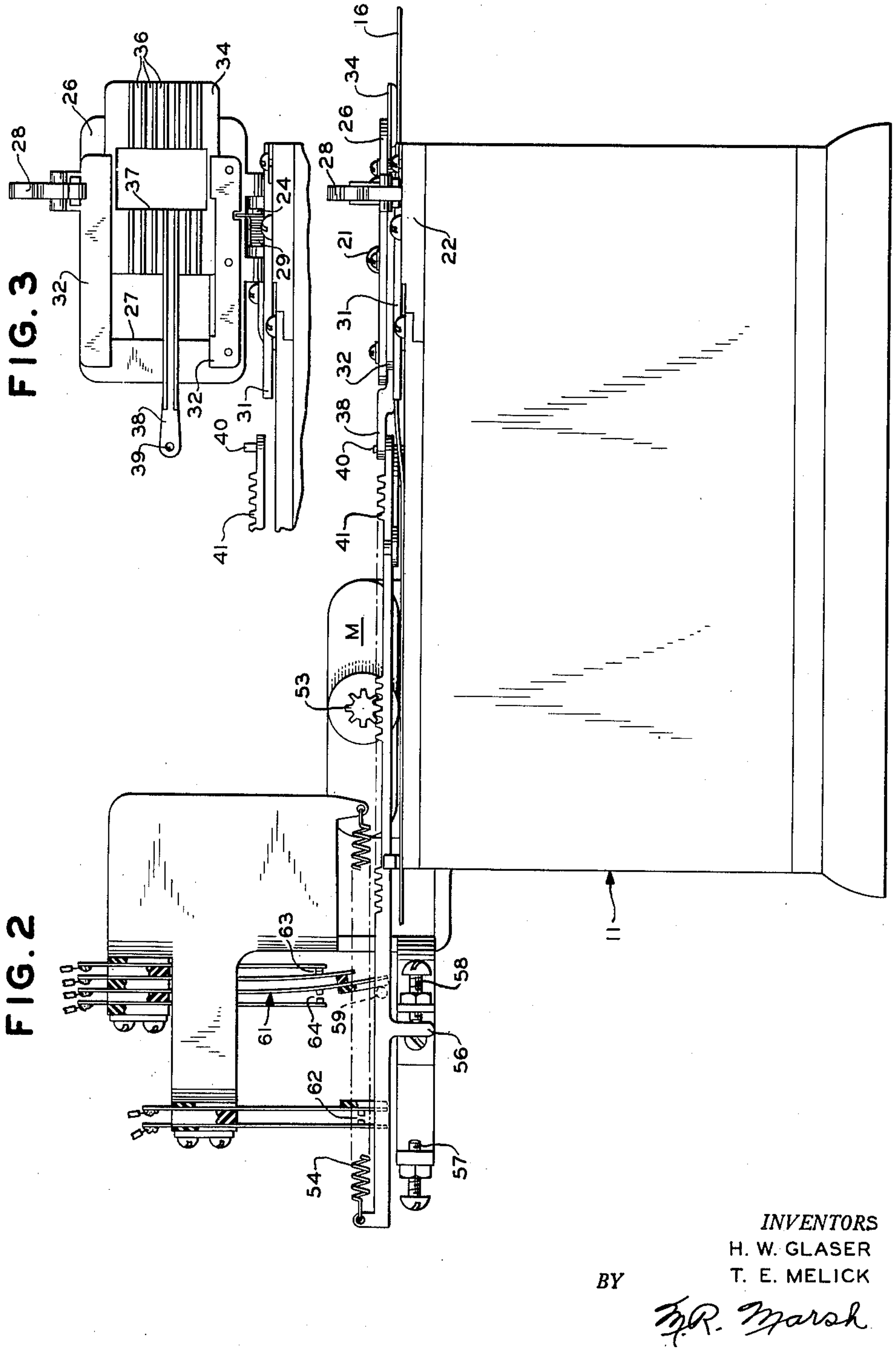
Fig. 2 is an elevational side view of the elements shown in Fig. 1.
Fig. 3 is a fragmentary detailed view of the tape holding lid in an elevated or open position.

Referring now to Figs. 1 and 2, the tape transmitter indicated generally by reference numeral 11 may be of well known type similar to that disclosed in U. S. Patent 1,298,440, issued to G. R. Benjamin, and includes a set of terminals 12 whereby electrical connection is made to the various elements in the transmitter when it is placed in an appropriate position on a transmitter sub-base. In general the transmitter includes, as shown in Fig. 5, an operating magnet 13 and a set of sensing fingers 14 with pins 14a at the upper end thereof adapted to sense the perforations in the tape 16 guided across the top of the transmitter. The sensing fingers 14 control through individually associated arms 17 a set of contacts (not shown) one for each sensing finger, so that when a sensing finger 14 passes through a perforation in the tape, the associated contact is operated in one position, and when the finger is blocked, the contact is operated in another position. In connection with each sensing operation, a feed wheel 18 is stepped to advance the tape 16 and bring the next transverse section thereof over the sensing pins 14a to be subsequently sensed.

Attached by screws 21, Fig. 1, to the top plate 22 of the transmitter 11 is a block 23 to which is hinged by a pin 24 a tape lid 26. The tape lid 26 is rectangular in shape and has an opening 27 in the center thereof for purposes hereinafter set forth and at its front edge has a latch 28. The latch 28 serves to latch the lid 26 in its closed position. A spring 29 coiled about the pin 24 tends to elevate the lid 26 to the open position shown in Fig. 3 to facilitate the threading of the perforated tape through the transmitter. Directly below the lid 26 is a tape guide plate 31 secured to the top of the tape transmitter and which has in the upper surface thereof a channel for guiding the tape 16. The width of the channel is slightly greater than the width of the tape 16 so as to permit free movement of the tape therethrough while at the same time keeping the sidewise movement of the tape at a minimum.

Secured to the underside of the lid 26 are a pair of guide bars 32, Fig. 6, one on each of the longer sides of the lid. The bars 32 have on the inner opposite sides thereof projections 33 which with the underside of the lid 26 form guideways for a slide member 34. The slide member 34 is adapted to freely slide along the lid and formed on the underside thereof are a series of slots 36 for purposes hereinafter pointed out. The depending sections of the slide 34 or the sections making up the sides of the slots 36 extend down into the channel in the guide 31 and thereby when the lid is in the latched position hold the tape 16 in the guide. The clearance between the slide 36 and the guide channel for the tape is sufficient to provide the free movement of the tape therethrough.

Adjacent the center of the slide 34 is a rectangular opening 37. The opening 37 is slightly wider than the width of the tape 16 so as to permit the passage of the tape therethrough in the forming of a loop as hereinafter disclosed. The ends of the opening 37 in the slide 34 may be rounded to facilitate the formation of a loop of tape. Extending from the left hand side of the slide 34 is an arm 38 with the hole 39 adjacent the end thereof. When the lid 26 is latched in a closed position, the hole 38 engages a pin 40 in the right hand end of a rack 41. The rack 41 is suitably guided for longitudinal movement along the top of the transmitter 11 and when the lid 26 is unlatched the pin 39 and arm 38 are disengaged.

Supported on a bracket 42 secured to the back of the transmitter is a magnet 43 consisting of two coils which is hereinafter referred to as the tape hold magnet. The tape hold magnet 43 has in operative relation with the upper pole pieces thereof an armature 44. The armature 44 has secured to the left hand end thereof, as shown in Fig. 4, an armature lever 46. The armature lever 46 is pivoted adjacent its center on a screw 47 and the bifurcated right hand end engages a flanged collar 48 having a pin 49 extending from the upper side thereof. A spring 51 normally biases the armature lever 46 in the position shown in Fig. 4 and when energized, the tape hold magnet 43 pivots the armature lever to elevate the pin 49. The pin 49 is guided in a sleeve 52 secured to the underside of the guide 31 at a point to the left of, as shown in Fig. 1, the sensing fingers 14a of the transmitter. The pin 49 is in line with the feed wheel 18 of the transmitter and is adapted to engage the feed holes 16a of the tape 16. Normally or with the magnet 43 deenergized, the pin 49 is below the upper surface of the guide 31 so as not to interfere with the movement of the tape 16 through the guide. However when energized the magnet 43 causes the pin 49 to rise and extend through a feed hole in the tape and thereby block further movement of the tape at this point. One of the channels or slots 36 in the slide 34 is continued into the arm 37 and overlies the pin 49 to facilitate movement of the pin through a feed hole. The remaining slots 36 are in alignment with the sensing pins 14a so that the slide may be operated with the sensing pins 14a or the pin 49 in an elevated position. Thus, the position of the sensing pins 14a or the pin 49 do not interfere with the movement of the slide 34.

Suitably secured to the transmitter is a motor M with a pinion 53 engaging with the rack 41. The motor M when energized is adapted to rotate the pinion 53 in a clockwise direction and thereby move the rack 41 to the left against the action of an attached spring 54. Depending from the rack 41 adjacent the left hand end thereof is a projection 56 which cooperates with adjustable screw stops 57 and 58 to limit the amount of back and forth movement of the rack 41. A pin 59 extending from the side of the rack 49 is adapted to operate contact sets 61 and 62. The contact set 62 is normally open and when the rack is moved to its extreme left hand position these contacts are closed. In its extreme right hand position, the pin 59 closes contacts 63 of set 61 and shortly after moving from its extreme right hand position the pin 59 permits contact 63 to open and 64 to close. The contact sets 61 and 62 are employed in control circuits for the transmitter.

The manner of operation of the transmitter will now be described as it may be employed in conjunction with the transmission of a message at a switching center. At a switching center, the perforated tape controlling the transmitter will have messages stored therein with each message separated by a predetermined series of perforations constituting an end-of-message signal. Each message will also be preceded by a preamble including message directing or switching characters as well as message identifying and other service signals. As the directing characters pass through the transmitter, they control switching equipment to establish the desired outgoing channel or circuit therefrom and in order for the same directing characters to be transmitted over the established circuit and again employed for a similar purpose, such as at a distant switching center, the section of the tape containing these characters must again pass through the transmitter to control the same a second time. In accordance with the above, it will be assumed that the transmitter 11 has been stopped by an end-of-message signal of a previously transmitted message which will cause through circuits arranged to operate in the conventional manner the energization of relay 66, Fig. 9. The circuit to the step magnet 13 of the transmitter is through back contacts of relay 66 and hence the energization of relay 66 will interrupt this circuit and stop the transmitter. Normally, the impulses for stepping the transmitter step magnet 13 originate at potenial 67 which is periodically interrupted by an interrupter 68. At a point 69 the circuit from the interrupter divides with one circuit continuing through normally closed contacts 71 of the make-before-break contact set 72, the right hand coil of relay 73, and thence through contacts of relay 66 and the coil of step magnet 13 to ground. The other branch of the circuit from point 69 extends over conductor 74, through make contacts of relay 76, the normally closed contacts 63 of contact set 64, conductor 77, and the left hand coil of relay 73 where it joins the previously described circuit to the step magnet. The relay 73 is differentially wound so that pulses flowing through the two coils thereof neutralize each other and as long as the circuit to neither circuit is interrupted the relay 73 remains deenergized. Should the circuit through one coil be interrupted as by the opening of the contacts 63, the stepping pulse flowing through only the right hand coil of relay 73 will energize the same which locks up through the contact set 72 while opening the contacts 71. Thus, the locking circuit for relay 73 is established through the right hand coil thereof and the coil of the step magnet 13 to thereby also hold it energized. When the interrupted parallel circuit is recompleted, as by the closing of contacts 63 for example, the stepping pulse flowing through the left hand coil of relay 73 in opposition to that in the right hand coil will cause relay 73 to release and at the end of this step pulse the step magnet 13 releases. Thereafter the following step pulses are effective to operate the step magnet to advance the tape one step for each pulse.

Relay 66 which was operated by the end-of-message signal of the previously transmitted message may also be controlled by tape lever contacts operated in the usual manner to halt the transmitter when the supply of tape has decreased to a predetermined minimum.

With a message in the tape 16 ready to be transmitted by running through the transmitter 11, relay 66 is released but before the release thereof relay 78 is energized. Relay 78 in operating interrupts the circuit to relay 76 and completes a circuit to relay 79 whereby the former relay releases and the latter is operated. As relay 76 releases, one of the branches of the above-described parallel circuits is open so that should a stepping pulse be received from the interrupter 68 at this time it causes relay 13 to operate and lock up. The operation of relay 79 completes a circuit from a potential source, such as an A. C. source to the motor M. The operation of motor M through the pinion 53 and rack 41 causes the slide 34 to be moved to the left. Since the motor M is of the shade pole tape, it may be stalled when the rack reaches the limit of its leftward movement while still maintaining the side in its left hand position. As the slide leaves its right hand position, the pin 59 on the rack 41 permits contacts 63 to open and contacts 64 to close and just as the rack reaches its left hand position the pin 59 closes contacts 62. The opening of contact 63 opens one of the parallel circuits to the transmitter step magnet 13 to prevent its operation and the closing of contact 62 with relay 79 operated reestablishes this parallel circuit. Thus, stepping pulses received during the time of movement of the slide 34 and rack 41 from its right hand position to its left hand position are not effective to energize the step magnet 13.

The closing of contact 64 completes a circuit to the tape hold magnet 43 causing the energization thereof which results in the elevation of the pin 49 through a feed hole in the tape 16 as shown in Fig. 7 to prevent further movement of the tape thereat. Now when the relay 66 is deenergized to complete the circuit of the step magnet 13 to advance the tape one step in conjunction with each energization of the magnet, the tape will form a loop 16*a* between the pin 49 and the feed wheel 18. This loop 16*a* will extend up through the opening 37 in the slide 34 as shown in Fig. 7, and will increase in size as long as the pin 49 is held operated and the feed wheel 18 continues to advance the tape. While the tape is thus advancing to form the loop 16*a* between the pin 49 and the feed wheel 18, the tape is still in operative relation with the sensing pins 14*a* of the transmitter and accordingly the transmitter is effective to transmit the signals in the tape forming the loop.

In the above cited example the section of the tape forming the loop 16*a* will contain the directing or switching signals and, if desired, the message identifying information preceding the message. The directing characters, which were sensed by the transmitter as the loop 16*a* was being formed, control the switching equipment to register or establish the desired path over which the message is to be transmitted. Following this operation the relay 78 is released, and its release may be controlled by certain characters in the tape which when sensed control circuits for the release of relay 78 or it may be controlled manually or by a character counter, which counts the characters sensed by the transmitter following the operation of relay 78. Release of relay 78 causes relay 79 to release and the operation of relay 76.

As relay 79 is released, one of the parallel circuits through a coil of relay 73 and the step magnet 13 is interrupted and any following step pulses will cause the operation of relay 73 and magnet 13 and the locking up thereof. The release of relay 79 also interrupts the circuit to the motor M whereupon the spring 54 is effective to start moving the slide member 34 to the right back into its normal position. As the slide 34 leaves its left hand position, the contacts 62 open and just as it reaches its extreme right hand position, contacts 64 open and contacts 63 close. The closing of contacts 63 reestablish the interrupted parallel path to the relay 73 and step magnet 13 so that should these relays be locked up at this time, the next step impulse is effective to release the relay 73 and the step magnet 13. Thus after the return of the slide member 34 to its right hand position all following step pulses are effective to operate relay 73 and advance the tape one step in conjunction therewith. Thus during the movement of the slide member from its left hand to its right hand position any received step pulses are ineffective to advance the tape. The opening of contacts 64 interrupts the circuit to the tape hold magnet 43 whereupon it releases and withdraws the pin 49 from the tape 16 so that movement of the tape at this point is no longer impeded.

The slide member 34 is shown in its extreme left hand position in Fig. 7 with a tape storage loop 16*a* extending thereabove. As the slide member 34 moved from the position 7 to its right hand or normal position as shown in Fig. 8, the forward or leading section of the loop 16*a* is straightened out in the tape guide channel and brought into registry with the sensing pins 14*a* as well as the feed wheel 18. During this movement of the slide the major portion of the tape loop 16*a* is moved to the right and to the right of the feed wheel 18 so that as the feed wheel subsequently operates to advance the tape, the major portion of the loop is rerun over the sensing pins 14a. Accordingly, a major portion of the tape in the loop 16a or all but the part extending from the pin 49 to the sensing pins 14a in Fig. 8 is positioned to be rerun over the sensing pins 14a. At this time the switching operation will have been completed and the directing characters contained in the loop 16a will be transmitted through the switching equipment to the storage tape at another switching center, for example, to control the switching equipment thereat.

After the slide member 34 moves the major portion of the tape loop 16a to the right as shown in Fig. 8, subsequent operation of the feed wheel 18 decreases the size of the loop 16a until the tape assumes a straight path to the left of the feed wheel, and then the tape is taken from the loop formed between the transmitter and its associated tape preparing mechanism.

It will be noted that the time required for the slide member 34 to move from its left hand to its right hand or normal position can be very short, and during this time the tape loop 16a is conditioned for rerunning over the sensing pins 14a. It will also be noted that there is no limitation in the size that the tape loop 16a may assume, and hence any number of directing characters and message identification signals may be included therein as well as a part or all of the accompanying message, if desired.

While the invention has been shown in but a single preferred embodiment thereof, it will be obvious that various modifications may be made therein without departing from the spirit or essential attributes thereof, and it is desired therefore that only such limitations be placed thereon as are specifically set forth in the appended claims.

What is claimed is:

1. In a storage tape controlled transmitter having tape advancing means and tape sensing means, a storage tape, a slidable member associated with said transmitter for forming a loop in said tape following the sensing thereof and means including said slidable member for automatically transferring all but a predetermined amount of the tape of said formed loop to a position before said sensing means to enable the repeat sensing of selected portions of said tape.

2. In a storage tape controlled transmitter having tape advancing means and tape sensing means, a storage tape, a slidable member associated with said transmitter for forming a loop in said tape following the sensing thereof, means including said slidable member for automatically transferring all but a predetermined amount of the tape of said formed loop to a position before said sensing means to enable the repeat sensing of selected portions of said tape, and means to disable said tape advancing means during the transferring of said loop.

3. In combination with a signal storage tape and a storage tape controlled transmitter, said transmitter having tape sensing means and tape advancing means for moving said tape in one direction with respect to said sensing means, means operative during a first sensing of a selected section of said tape to form a loop of the tape containing said selected section and means for automatically positioning said loop to enable a second sensing by said sensing means of the selected section thereof.

4. In a storage medium controlled sensing device, a storage medium sensing means, a storage medium advancing means for moving said medium in one direction relative to said sensing means, means operative during advancement of said storage medium past said sensing means by said advancing means to form a loop of said sensed medium and means for automatically conditioning a part of said loop for a second movement past said sensing means by said advancing means.

5. In a storage medium controlled sensing device, a storage medium sensing means, a storage medium advancing means for moving said medium in one direction relative to said sensing means, means independent of said medium advancing means for automatically conditioning selected portions of said storage medium for movement past said sensing means a second time by said advancing means.

6. In a telegraph tape transmitter for transmitting signals representing information stored in a storage tape, a tape sensing means and a tape advancing means therein, a slide member movable in the direction of the length of said tape, means engageable with said tape at a position following movement thereof past said sensing means and said advancing means to prevent further movement at said position and cause the formation of a tape loop between said position and said tape sensing and advancing means, and means including said slide member for transferring said tape loop from a position following said tape sensing and advancing means to a position ahead of said tape sensing and advancing means.

7. In a telegraph tape transmitter for transmitting signals representing information stored in a storage tape, a tape sensing means and a tape advancing means therein, said advancing means normally moving said tape in a substantially straight path through said transmitter, means operative on said tape following association thereof with said tape advancing and sensing means to prevent movement thereof past a predetermined point in its path of travel through said transmitter and compel the formation of a loop in said tape between said point and said tape sensing and advancing means during operation of said advancing means with movement of said tape prevented at said predetermined point, and means for automatically transferring the thus formed loop in said tape to a position where said advancing means is effective to advance the tape forming said loop past said sensing means a second time.

8. In a telegraph tape transmitter for transmitting signals representing information stored in a storage tape, said transmitter having tape sensing means and tape advancing means, said advancing means moving said tape past said sensing means in one direction, means operative on said tape after association with said sensing and advancing means for stopping movement thereof, means operative thereafter on further operation on said advancing means to form a loop of the tape advanced by said advancing means and means independent of said advancing means for automatically moving said tape loop ahead of said advancing means whereby said advancing means is effective to advance selected portions of said tape past said sensing means a second time.

9. In a telegraph tape transmitter for transmitting signals representing information stored in a storage tape, said transmitter having tape sensing means and tape advancing means, said advancing means moving said tape past said sensing means in one direction, means operative on said tape after association with said sensing and advancing means for stopping movement thereof, means operative thereafter on further operation of said advancing means to form a loop of the tape advanced by said advancing means, means independent of said advancing means for automatically moving said tape loop ahead of said advancing means whereby said advancing means is effective to advance selected portions of said tape past said sensing means a second time, and means to prevent operation of said tape advancing means during movement of said loop of tape ahead of said advancing means.

10. In a telegraph tape transmitter for transmitting telegraph signals representing information stored in a control tape, said transmitter having a tape sensing means and a tape advancing means, means operative on said tape to stop movement thereof at a position following operative association thereof with said sensing and advancing means while permitting continued operation of said sensing and advancing means, such continued operation of said advancing means causing a loop to be formed in said tape between said stopped position and said sensing means and means for automatically transferring said tape loop to a position ahead of said tape advancing and sensing means to enable operative association of selected sections of said tape with said sensing means a plurality of times.

11. In a telegraph tape transmitter for transmitting telegraph signals representing information stored in a control tape, said transmitter having a tape sensing means and a tape advancing means, means for stopping movement of said tape at a point following its association with said advancing and sensing means whereby continued operation of said advancing means causes a tape loop to be formed between the point where its movement is stopped and said advancing and sensing means, and means for automatically reassociating the tape of said loop sensed and advanced during operation of said stopping means in stopping movement of said tape with said sensing and advancing means a second time.

References Cited in the file of this patent

UNITED STATES PATENTS

| | | |
|---|---|---|
| 2,371,367 | Warburton | Mar. 13, 1945 |
| 2,463,696 | Keyes | Mar. 8, 1949 |
| 2,518,405 | Van Duuren | Aug. 8, 1950 |